US007537835B2

(12) United States Patent
Mori et al.

(10) Patent No.: US 7,537,835 B2
(45) Date of Patent: May 26, 2009

(54) HIGH FRICTION SLIDING MEMBER

(75) Inventors: Hiroyuki Mori, Nisshin (JP); Hideo Tachikawa, Nisshin (JP); Masaru Okuyama, Nisshin (JP); Mamoru Tohyama, Nagoya (JP); Toshihide Ohmori, Nagoya (JP); Kazuyuki Nakanishi, Seto (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 538 days.

(21) Appl. No.: 10/488,290

(22) PCT Filed: Sep. 25, 2002

(86) PCT No.: PCT/JP02/09904

§ 371 (c)(1),
(2), (4) Date: Mar. 2, 2004

(87) PCT Pub. No.: WO03/029685

PCT Pub. Date: Apr. 10, 2003

(65) Prior Publication Data

US 2004/0234770 A1 Nov. 25, 2004

(30) Foreign Application Priority Data

Sep. 27, 2001 (JP) ............................. 2001-297563
Apr. 24, 2002 (JP) ............................. 2002-122519

(51) Int. Cl.
*B32B 9/00* (2006.01)
(52) U.S. Cl. ........................ 428/408; 428/336; 428/446; 428/698; 428/704
(58) Field of Classification Search ................. 428/408, 428/446, 336, 704, 698
See application file for complete search history.

(56) References Cited

U.S. PATENT DOCUMENTS 5,198,285 A     3/1993   Arai et al.
5,249,554 A * 10/1993   Tamor et al. ................. 428/446
5,266,398 A * 11/1993   Hioki et al. ................. 428/336

(Continued)

FOREIGN PATENT DOCUMENTS

EP    0 509 875    10/1992

(Continued)

OTHER PUBLICATIONS

Kano et al "the Effect of ZDDP and MODTC Additives on Friction properties of DLC and Steel Cam Followers in Engine Oil" Abstracts of papers 2nd World Tribolgy Congress, Sep. 3-7, 2001 p. 342.*

(Continued)

*Primary Examiner*—Archene Turner
(74) *Attorney, Agent, or Firm*—Oblon, Spivak, McClelland, Maier & Neustadt, P.C.

(57) ABSTRACT

Under wet sliding conditions using drivetrain system lubricating oils, a high frictional sliding member exhibiting a high friction coefficient, a favorable μ–v characteristic stably, excellent wear resistance, and low mating-member aggressiveness is provided. The present invention is a wet sliding member comprising: a substrate composed of metal, ceramics, or resin; and an amorphous hard carbon film formed integrally on a surface of the substrate, having a surface, at least a part of which is turned into a sliding surface for sliding under wet conditions, and containing at least either one of Si and N in an amount of from 1 to 50 atomic %.

11 Claims, 7 Drawing Sheets

U.S. PATENT DOCUMENTS

| | | | |
|---|---|---|---|
| 5,616,374 A * | 4/1997 | Sho | 427/577 |
| 5,771,873 A * | 6/1998 | Potter et al. | 123/668 |
| 6,139,022 A * | 10/2000 | Iwashita et al. | 277/443 |
| 6,214,479 B1 | 4/2001 | Mori et al. | |
| 6,325,385 B1 * | 12/2001 | Iwashita et al. | 277/442 |
| 6,652,969 B1 * | 11/2003 | Murakami et al. | 428/408 |
| 6,740,393 B1 * | 5/2004 | Massler et al. | 428/216 |
| 6,821,497 B2 * | 11/2004 | Moronuki | 428/408 |
| 6,844,068 B1 * | 1/2005 | Miyake et al. | 428/408 |
| 6,969,198 B2 * | 11/2005 | Konishi et al. | 384/13 |
| 2004/0234770 A1 | 11/2004 | Mori et al. | |
| 2005/0142361 A1 * | 6/2005 | Nakanishi et al. | 428/408 |

FOREIGN PATENT DOCUMENTS

| | | | |
|---|---|---|---|
| JP | 62-070214 | | 3/1987 |
| JP | 62-157602 | | 7/1987 |
| JP | 02-212633 | | 8/1990 |
| JP | 3-125038 | | 5/1991 |
| JP | 3-163242 | | 7/1991 |
| JP | 3-240957 | | 10/1991 |
| JP | 4-181022 | | 6/1992 |
| JP | 04-366029 | | 12/1992 |
| JP | 05-179451 | * | 7/1993 |
| JP | 06-101047 | * | 4/1994 |
| JP | 7-54150 | | 2/1995 |
| JP | 7-149583 | | 6/1995 |
| JP | 07-179875 | | 7/1995 |
| JP | 8-262445 | | 10/1996 |
| JP | 09-137180 | | 5/1997 |
| JP | 09-316475 | | 12/1997 |
| JP | 11-315924 | * | 11/1999 |
| JP | 2000-191283 | | 7/2000 |
| JP | 2000-309641 | | 11/2000 |
| JP | 2001-192864 | | 7/2001 |
| JP | 2001-214269 | | 8/2001 |
| JP | 2001-316686 | | 11/2001 |
| JP | 2002-213485 | | 7/2002 |
| JP | 2000-336386 | | 12/2002 |
| JP | 2003-343597 | | 12/2003 |
| JP | 2004-169788 | | 6/2004 |

OTHER PUBLICATIONS

U.S. Appl. No. 11/115,192, filed Apr. 27, 2005, Mori et al.

* cited by examiner

HIGH FRICTION SLIDING MEMBER

TECHNICAL FIELD

The present invention relates to a high frictional sliding member which comprises an amorphous hard carbon film capable of producing a high friction coefficient under wet conditions using oils. More particularly, it relates to a high frictional sliding member which has higher adhesion strength of the films on the substrates, which exhibits wear resistance and low mating-member aggressiveness, and which shows a high frictional characteristic under wet conditions.

BACKGROUND ART

A sliding member for wet clutches which is subjected to nickel-phosphorus plating is disclosed in Japanese Unexamined Patent Publication (KOKAI) No. 4-181022 as high frictional metallic materials suitable for sliding members of power transmission device. Moreover, a metallic belt member for continuously variable transmissions which is subjected to electrolytic nickel plating is disclosed in Japanese Examined Patent Publication (KOKOKU) No. 6-41780.

However, it is not possible for these sliding members which are subjected to nickel-phosphorus plating, electrolytic nickel plating, and the like, to stably produce a desired high friction coefficient. This results from the fact that film peeling is likely to occur because the stress generated in the interface between films and substrates enlarges when the friction coefficient is high so that the adhesion strength is not effected sufficiently between films and substrates by conventional filming processes. Therefore, it is necessary to enhance the adhesion strength between films and substrates in order to maintain a stably high friction coefficient.

In Japanese Unexamined Patent Publication (KOKAI) No. 7-149583 and Japanese Unexamined Patent Publication (KOKAI) No. 8-262445, there are disclosed sliding members covered with amorphous hard carbon films whose major components are carbon and hydrogen. The amorphous hard carbon films have attracted the attention of engineers, because they show a low friction coefficient and excellent wear resistance, though they exhibit high adhesion strength of films on substrates. However, conventional amorphous hard carbon films which do not contain silicon or nitrogen exhibit a low friction coefficient even under wet conditions using lubricating oil, and are not suitable for members, which are desired to exhibit a high frictional property, such as sliding members for power transmissions.

Moreover, in component parts for power transmissions, it is also necessary to inhibit the occurrence of self-excited vibrations (shudder) of entire vehicles, self-excited vibrations which result from the stick-slip of sliding portions. In order to inhibit shudder, regarding the velocity dependent characteristic of friction coefficient ($\mu$–v characteristic), it is desired that the tendency of lowering friction coefficient, that is, the $\mu$–v negative gradient tendency be lower as sliding velocity increases. In general, however, the higher friction coefficient is, the more it is likely that the $\mu$–v negative gradient tendency enlarges. Therefore, sliding members suitable for component parts in power transmission device are required to exhibit not only a high frictional characteristic but also a favorable $\mu$–v characteristic.

Moreover, since those with high aggressiveness to mating materials cause wear to mating members to impair their optimum sliding surface profile, it is a problem that a desirable frictional characteristic cannot be maintained either.

It has not been possible for conventional wet sliding members to fully satisfy all of these characteristics.

Hence, an object of the present invention is to provide a high frictional sliding member which has higher adhesion strength of the coatings on the substrate, which exhibits wear resistance, whose mating-member aggressiveness is low, and which exhibits a high frictional characteristic and a favorable $\mu$–v characteristic.

DISCLOSURE OF INVENTION

The present invention is a wet sliding member for transmitting torque by friction under wet sliding conditions using oils, the wet sliding member comprising: a substrate; and an amorphous hard carbon film formed integrally on a surface of the substrate, having a surface, at least a part of which is turned into a sliding surface for sliding under wet conditions, and containing at least either one of Si and N in an amount of from 1 to 50 atomic %. Note that it is preferred that the substrate be composed of metals, ceramics and resins.

Moreover, in the amorphous hard carbon film of the present wet sliding member, H can be contained in an amount of from 1 to 50 atomic %, and Si can preferably be contained in an amount of from 3 to 20 atomic %. A hardness of the amorphous hard carbon film can desirably be HV 800 or more, and an adhesion strength between the substrate and the amorphous hard carbon film can be 30 N or more, moreover a thickness of the amorphous hard carbon film can preferably be 1 µm or more. A surface roughness of the sliding surface of this high frictional sliding member can desirably be from 0.3 to 10 µm Rz.

The amorphous hard carbon film can be formed by dry processes such as plasma CVD, sputtering, ion plating and ionization deposition.

The amorphous hard carbon film is formed while introducing silicon including gas or nitrogen including gas simultaneously with a carbon raw material gas in forming a film. In this instance, it is possible to use targets including silicon or nitrogen instead of the silicon including gas or the nitrogen including gas.

Moreover, in order to secure an adhesion strength between the substrate and the amorphous hard carbon film, it is desirable to form fine protrusions on the surface of the substrate, protrusions whose average height falls in a range of from 10 to 100 nm and average width falls in a range of from 10 to 300 nm, by pre-sputtering before coating.

In addition, it is preferable that the oils can be drivetrain system lubricating oil including alkaline earth metal detergent and/or ashless dispersant, and it is desirable that fragments, such as $Ca+$, $C_5H_9+$ and $C_7H_{13}+$, which generate from the drivetrain system lubricating oil, can be adsorbed on a surface of the amorphous hard carbon film.

BEST MODE FOR CARRYING OUT THE INVENTION

Figure 1:
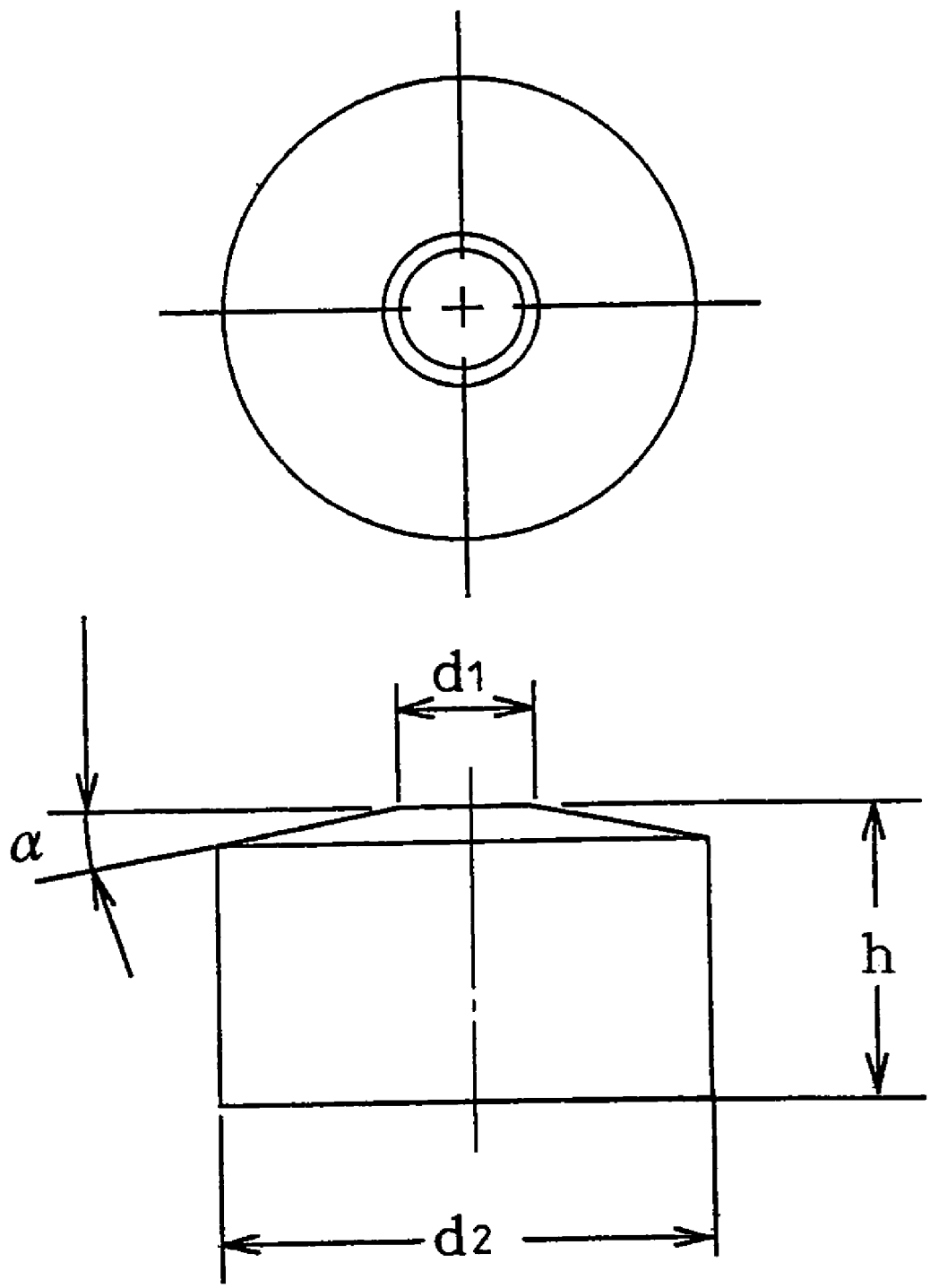
FIG. 1 is a diagram for illustrating a shape of a lower test sample which was used in a friction test between a metallic material and another metallic material.

The amorphous hard carbon film which is formed on the sliding surface of the present highly frictional sliding member contains at least one of silicon and nitrogen in addition to carbon and hydrogen. It is possible to judge from the result of the X-ray diffraction test and the like that carbon films are amorphous carbon films. Moreover, this amorphous hard carbon film is such that it is possible to confirm by the Raman spectroscopic analysis and so forth that amorphous carbon is composed of pseudo diamond as a major component. Therefore, this amorphous hard carbon film exhibits a Vickers hardness of 800 or more.

The hydrogen content in the amorphous hard carbon film depends on the types of production raw materials and the conditions of vapor deposition, however, can desirably be from 1 to 50 atomic %. It can further preferably be from 20 to 40 atomic %, furthermore preferably be from 25 to 35 atomic %. When falling within this range, the adhesion strength of the films on substrates is more favorable.

The Si content and N content in the amorphous hard film are determined from the viewpoints of obtaining favorable adhesion strength and wear resistance as well as a high frictional property under wet conditions. From such viewpoints, it is desirable that the Si content can be from 1 to 50 atomic %. In particular, in cases where the mating member is metallic materials or ceramic materials, it is preferable that the Si content in the amorphous hard carbon film can be from 3 to 20 atomic %. This result from the fact that a sufficiently high friction coefficient cannot be obtained when being less than 3 atomic %, and that it is not preferable because the wear amount of amorphous hard carbon films enlarges when exceeding 20 atomic %. It is further preferable that it can be from 5 to 15 atomic %.

Moreover, the N content in the amorphous hard carbon film can appropriately be from 1 to 50 atomic %. When the N content is less than 1 atomic %, a fully high friction coefficient cannot be obtained; and when it exceeds 50 atomic %, it is not preferable because the wear resistance is deteriorated. In particular, in the case of metals or ceramics, it is preferable that the N content in the amorphous hard carbon film can be from 3 to 30 atomic %.

The addition of Si and N into the amorphous hard carbon film can be such that Si or N is added independently, but it is possible to mix Si with N and add them. In this case, it is desirable that Si+N can be from 2 to 30 atomic %.

The present high frictional sliding member can be produced by introducing a carbon raw material, a silicon raw material and a nitrogen raw material into a vapor deposition chamber in which a substrate is disposed and vapor depositing the amorphous hard carbon film which contains silicon and nitrogen on the substrate.

As for the carbon raw material, it is possible to name hydrocarbons, for example, as for the hydrocarbons, it is possible to exemplify methane, acetylene, ethylene, and the like. An especially preferable hydrocarbon can be methane. As for the silicon raw material, it is possible to name tetramethylsilane (TMS), $SiH_4$, $Si_2H_6$, $SiCl_4$, $SiH_2F_2$, and so forth. Among them, since tetramethylsilane exhibits low toxicity and corrosion behavior and its operability is favorable, it is suitable for the silicon raw material. As for the nitrogen raw material, it is possible to name nitrogen ($N_2$) and nitrogen-containing compounds, for instance, as for the nitrogen-containing compounds, it is possible to exemplify ammonia, amines, and so on.

The carbon raw material, silicon raw material and nitrogen raw material are such that their gaseous substances are introduced into a vapor deposition chamber generally. Therefore, it is advisable to introduce those which are not a gas at room temperature by using appropriate carrier gases. For example, in the case of tetramethylsilane (TMS), a silicon raw material, it can be introduced as a mixture gas of tetramethylsilane and nitrogen into a vapor deposition chamber by using, for instance, a nitrogen gas, a nitrogen raw material, as a carrier gas with tetramethylsilane which is maintained at a constant temperature. Moreover, when introducing the aforementioned raw materials into a vapor deposition chamber, it is possible to use an inert gas, such as helium and argon, as a carrier gas. In addition, it is possible to use mixtures of raw-material compound gases and inert gases as a carrier gas.

The present high frictional sliding member can be produced by introducing the respective raw materials of carbon, silicon and nitrogen into a vapor deposition chamber in which a substrate is disposed and vapor depositing the amorphous hard carbon film on the substrate. The vapor deposition method is not limited in particular, and it is possible to appropriately use dry processes such as plasma CVD, sputtering, ion plating and ionization vapor deposition.

In the present invention, as for the substrate, it is possible to name metallic, ceramic and resinous sliding members. However, not limited to these, the other materials can likewise be the substrate as far as they are used as a wet sliding member. Note that, as for the metallic ones, it is possible name iron alloys such as SK4 and S35C, for example, as for the aluminum-based alloys, it is possible to exemplify A2000 series ones, AC4C, and the like, and moreover, as for the ceramic ones, it is possible to exemplify $Si_3N_4$, $Al_2O_3$, and so forth. In addition, as for the resinous substrates, it is possible to name phenols, polyimides, and so on.

In the present invention, it is possible to provide mechanical component parts, at least whose sliding portion is covered with the amorphous hard carbon film and which requires a high frictional characteristic under wet conditions. For example, they can be sliding portions for power transmission device, such as wet clutches used in automatic transmissions, driving force distributors, limited slip differentials and the like, synchronizers of manual transmissions and so forth, transmission units and so on of continuously variable transmissions. Therefore, it is desirable that, although the oils making the wet conditions of the present invention are not limited in particular, they can be drivetrain system lubricating oils.

In the present highly frictional sliding member, it is possible to appropriately vary the film thickness of the amorphous hard carbon film of the sliding portion by adjusting the vapor deposition conditions. Moreover, although the required film thickness depends on the applications of the present high frictional sliding member, it can desirably be 1 µm or more.

The present invention lies in providing a high frictional sliding member which exhibits a high friction coefficient and a favorable µ–v characteristic stably under wet sliding conditions using oils, which is good in terms of the wear resistance, and whose mating-member aggressiveness is low.

The amorphous hard carbon film formed integrally on the present high frictional sliding member is such that, contrary to conventional hard carbon films, a high friction coefficient can be obtained by including at least one of silicon and nitrogen under sliding conditions using the oils.

However, regarding the mechanism of this highly frictional phenomenon, it has not been apparent. Hence, the present inventors performed the following experiment while paying attention to the surface of amorphous hard carbon films after sliding.

Namely, with respect to a conventional amorphous hard carbon film obtained by a plasma CVD method and two types of the amorphous hard carbon film containing Si in an amount of 17 atomic % and 22 atomic %, a ball-on-disk test (concerning the testing methods, testing conditions and the like, they will be described in (5) Sliding Characteristic Assessment in EXAMPLES.) was performed, respectively, and adsorbates on the surface of the subsequent amorphous hard carbon films were analyzed. Here, an oil used in the test was "Castle Auto Fluid T-IV," a commercially available drivetrain system lubricating oil. Moreover, in order to analyze the adsorbates, a secondary ion mass spectrometry (TOF-SIMS) was used, and they presumed the adsorbates by identifying fragments on the surface of the amorphous hard carbon films and simultaneously measuring their intensities. The results are recited in Table 1.

TABLE 1

| Si Content (atomic %) | Friction Coefficient | Intensity of Fragment (Count) | | | | |
|---|---|---|---|---|---|---|
| | | Ca+ | $C_5H_9$+ | $C_7H_{13}$+ | $SO_3$– | $C_{12}H_{45}SO_3$– |
| 0 | 0.09 | 27500 | 1370 | 990 | 220 | 20 |
| 17 | 0.11 | 103000 | 15100 | 13500 | 230 | 80 |
| 22 | 0.13 | 120000 | 19800 | 20000 | 200 | 80 |

It is understood from Table 1 that the friction coefficient was enhanced by including Si in the amorphous hard carbon films. Moreover, 5 kinds of fragments, Ca+, $C_5H_9$+, $C_7H_{13}$+, $SO_3$– and $C_{12}H_{45}SO_3$–, were detected from the surface of these 3 types of the amorphous hard carbon films. And, in the amorphous hard carbon films containing Si, it was understood that the Ca+, $C_5H_9$+ and $C_7H_{13}$+ fragments were detected more than the amorphous hard carbon film free from Si.

These fragments are considered to result from additives included in the drivetrain system lubricating oil used in the present test. As for major additives included in this drivetrain system lubricating oil, it is possible to name succinimide, succinate ester and the like, being an ashless dispersant, Ca-sulfonate, Mg-sulfonate and so forth, being an alkaline earth metal detergent, phosphate ester, phosphite ester and so on. Being a phosphorus extreme-pressure agent, polymethacrylate, olefine copolymers and the like, being a viscosity index improver, or phenol-based or amine-based substances as an ashless anti-oxidant. Here, the $C_5H_9$+ and $C_7H_{13}$+ are assumed to be components derived from said succinimide, an ashless dispersant, moreover, the Ca+, $SO_3$– and $C_{12}H_{45}SO_3$– are assumed to be derived from the Ca-sulfonate, an alkaline earth metal detergent.

From the above-described facts, as for a mechanism of obtaining a high friction coefficient, it is believed that the amorphous hard carbon film in which Si is contained in an optimum amount is improved in terms of the friction coefficient because it adsorbs more additive components by sliding in drivetrain system lubricating oils including the aforementioned additives than the amorphous hard carbon film free from Si so that the shear resistance is enhanced in sliding. Therefore, it is desirable that a lubricating oil for obtaining high friction can contain an ashless dispersant and an alkaline earth metal detergent as additives. And, it is desirable that the respective contents can be from 0.1 to 10% by weight for an ashless dispersant and from 0.01 to 5% by weight for an alkaline earth metal detergent when the entire lubricating oil is taken as 100% by weight.

When a friction coefficient is high, a stress arising in the interface between films and substrates enlarges as well, and the film peeling is likely to occur. Hence, as a result of studying the practically required adhesion strength of films by means of friction tests and the like, it was understood that, when there is an adhesion strength of 30 N or more in steel component parts, the film peeling is not observed so that a practically favorable result can be obtained.

The evaluation on the adhesion strength between the substrate and the amorphous hard carbon film can be evaluated with the magnitude of a film coming-off load by a scratch test. More specifically, it is a method in which a load is considered a critical load when films are come off by scratching them with a diamond cone, whose apex angle is 120° and leading end has 0.2 mm R and to which a load is applied, and the adhesiveness of films is assessed with the magnitude of the critical load.

In order to secure this adhesion strength, for example, it is desirable to form fine protrusions on the surface of metallic substrates by ionic bombardments by means of glow discharge, ion beam and the like, protrusions whose average height falls in a range of from 10 to 100 nm and average width falls in a range of from 10 to 300 nm, before coating process.

In the metallic substrates with the fine irregularities formed, an adhesion strength of 30 N or more can be obtained by the anchor effect. When the height of the protrusions is less than 10 nm or exceeds 300 nm, no sufficient adhesion strength can be obtained. Note that the size of the protrusions cannot be measured with conventional surface roughness meters (stylus methods). However, the height and width of the protrusions can be confirmed by micro shape measuring means such as SEM (scanning electron microscope) observations and AFM (atomic force microscopes).

Even when the size of the protrusions is a predetermined one, if the area of the protrusions is less, no effect can be obtained in terms of the adhesion strength of films. It is preferable that the area occupying the protrusions can be 30% or more when the area of the irregular surface is taken as 100%. Being 30% or more, the adhesion of films is high. More preferably, it can be 50% or more.

Moreover, since the amorphous hard carbon film is so hard that it exhibits HV 800 or more, the wear resistance of the member is improved, and simultaneously the seizing with mating members is less likely to occur, and the mating-member aggressiveness is low. Thus, since it exhibits high wear resistance and low mating-member aggressiveness, the profile change of both sliding surfaces is less. Therefore, it is possible to inhibit the change of the frictional characteristic over a long period of time, and it is possible to maintain a high friction coefficient stably.

Here, a desirable surface profile as members which exhibit a high frictional characteristic under wet conditions is such that the surface roughness can be from 0.3 to 10 μm Rz. When the surface roughness is 0.3 μm Rz or less, oil films have occurred under sliding conditions, no high frictional characteristic can be secured. On the other hand, when the roughness is 10 μm Rz or more, the aggressiveness with respect to mating members is so high that no high friction coefficient can be maintained stably.

It is possible for the present high frictional sliding member to obtain a high frictional characteristic favorably under wet conditions when metals, ceramics or resins are used as a mating member. As mating members rubbing with the amorphous hard carbon film, it is possible to exemplify steels, aluminum alloys and the like for metals, and $Al_2O_3$, $Si_3N_4$ and so forth for ceramics, moreover, phenol and polyimide as for resins, paper friction materials and so on in which machine-made papers composed of cellulose fibers are impregnated with phenol resins as a binder and are hot cured.

EXAMPLES

Hereinafter, the present invention will be described in more detail with reference to specific examples.

(1) Frictional Characteristic Evaluation "A"

Coating Method

Example No. 1

While using a plasma CVD method, a methane gas was used as a carbon raw material, as for a silicon raw material, tetramethylsilane (TMS) was introduced into a plasma with a mixture gas of hydrogen and argon as a carrier gas. Here, the methane flow rate was 50 sccm, the silicon flow rate was 10 sccm, the reaction pressure was 5 torr, and the input electric power was 500 W. Note that, since the discharge is so unstable that the film density lowers when the coating temperature is lower than 100° C., the discharge process was carried out at a coating temperature of 500° C. The coating rate was 6 μm/hr. Under these conditions, the coating was carried out for 30 minutes, thereby obtaining an Si-containing amorphous hard carbon film whose film thickness was 3 μm. The film composition was 15Si-55C-30H by atomic %, respectively. The hydrogen content was measured by using an elastic recoil particle detection method (EDR). Specifically, it is a method in which a sample is bombarded by a 2-MeV He ion beam, hydrogen which is sputtered out of the inside of the sample is detected by a semiconductor detector to measure the hydrogen concentration in the sample.

As for a substrate, the lower test sample illustrated in FIG. 1 was used, lower test sample which was prepared with SK4 (carbon tool steel). The lower test sample was such that it was formed as a cylinder shape which had an inside diameter "d1" of 10 mm, an outside diameter "d2" of 32 mm, a height "h" of 20 mm, and a tapered surface whose angle α was 11°, and that the tapered surface was covered with the amorphous hard carbon film under said conditions to use it as a test sample. In this instance, the surface roughness of the covered surface was 1.0 μm Rz.

Example No. 2

As for a coating method, a sputtering method was used, as for a carbon raw material, a carbon target was used, and moreover, as for a nitrogen raw material, a nitrogen gas was used, thereby forming a film. The nitrogen gas flow rate was 10 sccm, the argon gas flow rate was 50 sccm, the reaction pressure was 3 mtorr, the coating output was 500 W, and the coating temperature was 250° C. Under these conditions, an N-containing amorphous hard carbon film whose film thickness was 2 μm was obtained. The resulting film composition was 5N-80C-15H by atomic %.

Note that, as for a substrate, an SK4 material whose shape was the same as Example No. 1 was used, and the tapered surface was covered with the aforementioned N-containing amorphous hard carbon film to use it as a test sample.

Example No.3

A plasma CVD method was used, a methane gas was used as a carbon raw material, tetramethylsilane was used as a silicon raw material, moreover, a nitrogen gas was used as a nitrogen raw material, and they were introduced into a plasma. Here, the methane flow rate was 50 sccm, the silicon flow rate was 4 sccm, the nitrogen flow rate was 20 sccm, the reaction pressure was 5 torr, the input electric power was 300 W, thereby carrying out a discharge process at a coating temperature of 200° C. The coating rate was 4 μm/hr. Under these conditions, the coating was carried out for 30 minutes, thereby obtaining an Si and N-containing amorphous hard carbon film whose film thickness was 3 μm: The film composition was 10Si-5N-55C-30H by atomic %, respectively.

Note that, as for a substrate, an SK4 material whose shape was the same as Example No. 1 was used, and the tapered surface was covered with the aforementioned Si and N-containing amorphous hard carbon film to use it as a test sample.

Comparative Example No. 1

A plasma CVD method was used, and a methane gas was used as a carbon raw material and was introduced into a plasma. Here, the methane flow rate was 50 sccm, the reaction pressure was 0.05 torr, the input electric power was 200 W, thereby carrying out a discharge process at a coating temperature of 250° C. The coating rate was 0.5 μm/hr. Under these conditions, the coating was carried out for 240 minutes, thereby obtaining an amorphous hard carbon film whose film thickness was 2 μm. The film composition was 75C-25H by atomic %.

Note that, as for a substrate, an SK4 material whose shape was the same as Example No. 1 was used, and the tapered surface was covered with the aforementioned amorphous hard carbon film to use it as a test sample.

Comparative Example No. 2

SK4 was used as a test sample, SK4 which was not covered with any amorphous hard carbon film but which was heat treated to exhibit HV 750 by quenching and tempering processes. The dimension and shape were the same as aforementioned Example Nos. 1 through 3.

Evaluation Method

Figure 2:
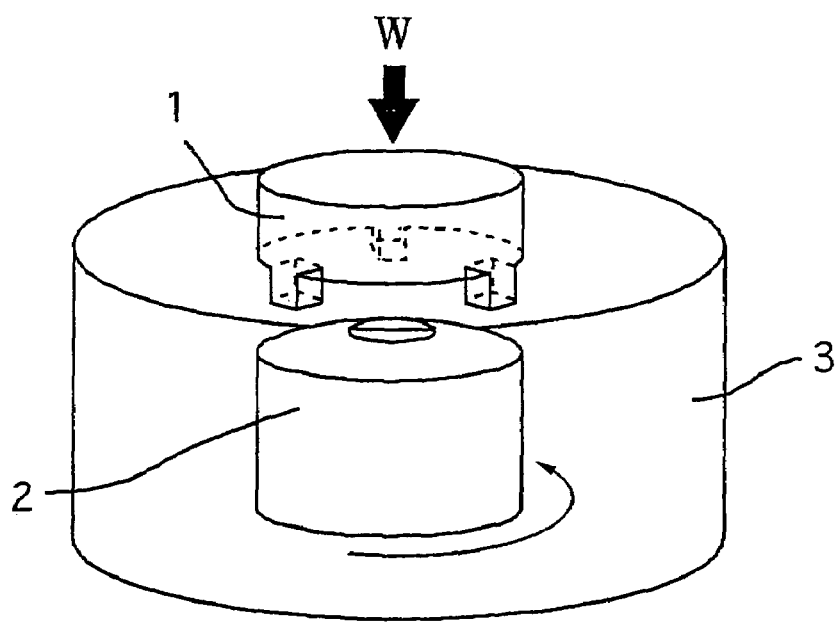
FIG. 2 is a schematic diagram for illustrating the friction test between a metallic material and another metallic material. The friction test is carried out while applying a load W to an upper test sample 1 to press it onto a lower test sample 2 and rotating it in an oil bath 3.

Frictional characteristic evaluation "A" used metals for two sliding members, and evaluated the frictional characteristic between a metallic material and another metallic material under a wet condition. The outline of the testing method is illustrated in FIG. 2.

This method is a method in which a specimen (hereinafter referred to as an upper specimen) having three block-shaped projections and made of an SK4 material is pressed from above onto a cone-shaped specimen (hereinafter referred to as a lower specimen) and the friction force arising between the upper specimen and the lower specimen upon rotating the lower specimen is measured.

Here, an SK4 material was used for the upper specimen, SK4 material which was heat treated to exhibit HV 750 by quenching and tempering processes in the same manner as the comparative example. The surface roughness of the tapered surface of the lower specimen was 1 μm Rz.

An assessment test was carried out in an oil bath filled with a drivetrain system lubricating oil. As for the drivetrain system lubricating oil, commercially available "Castle Auto Fluid TC" was used in an amount of 200 mL. The testing conditions are recited in Table 2.

TABLE 2

| Step | Break-in | | | | Test | | |
|---|---|---|---|---|---|---|---|
| | 1 | 2 | 3 | 4 | 5 | 6 | 7 |
| Sliding Velocity (mm/s) | 500 | | | | 100 | | |
| Load (kgf) | 30 | 40 | 50 | 60 | 40 | 60 | 80 |
| Max. Hertzian Pressure (MPa) | 159 | 183 | 205 | 224 | 183 | 224 | 259 |
| Time (min.) | 5 for Each | | | 15 | 1 for Each | | |
| Oil. Temp. (° C.) | | | | 100 | | | |

First, the lower specimen 2 whose tapered surface was covered with the amorphous hard carbon film prepared under the respective conditions was set onto a rotary shaft. Next, the upper specimen 1 was set onto a stationary shaft so as to bring the three block-shaped projections of the upper specimen 1 into contact with the tapered surface of the lower specimen 2. The sliding velocity between the upper specimen 1 and lower specimen 2 was fixed at 500 mm/s, and a load W was changed in 4 stages to break-in the upper specimen 1 with the lower specimen 2. First, the lower specimen 2 was rotated for 5 minutes while applying a load of 30 kgf, next, it was rotated for another 5 minutes while increasing the load to 40 kgf, moreover, it was rotated for another 5 minutes while increasing the load to 50 kgf. Thereafter, it was rotated for another 15 minutes while setting the load to 60 kgf, thereby completing a 30-minute break-in test in total. Thereafter, the friction coefficients were measured under a 3-stage load condition. That is, in 3 stages, 40, 60 and 80 kgf. Here, the slipping speed between the upper specimen 1 and lower specimen 2 was fixed at 100 mm/s, and the loading time was 1 minute, respectively. Note that the oil temperature of the oil bath 3 was kept at 100° C.

Moreover, the maximum hertzian pressure in Table 2 is the maximum value of pressures on an actual contact area for which the elastic deformation of the contacting portions between the upper specimen 1 and the lower specimen 2 is taken into consideration.

Evaluation Results

Figure 3:
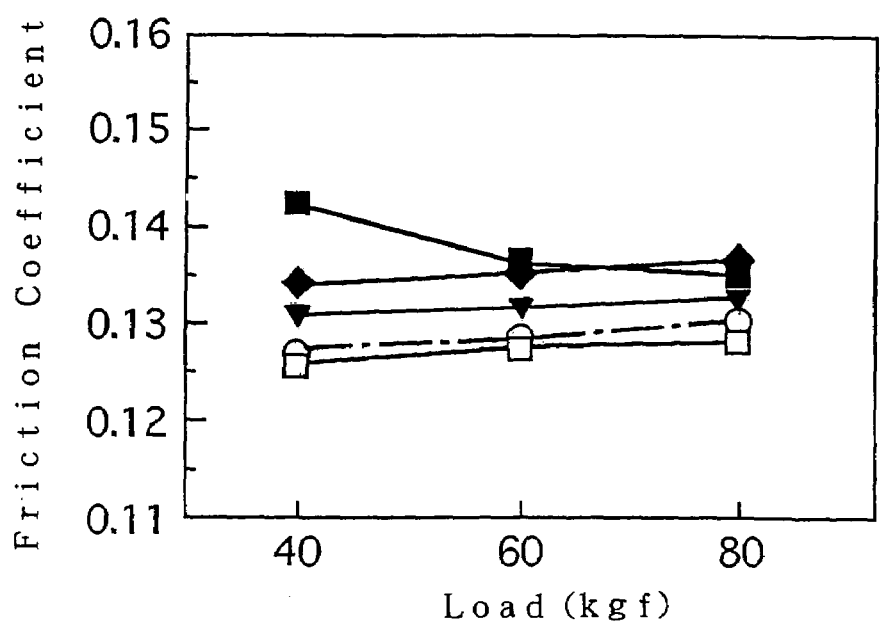
FIG. 3 is a graph for comparing friction coefficients in the friction test between a metallic material and another metallic material. "■" specifies the results of Example No. 1, "▼" specifies those of Example No. 2, "♦" specifies those of Example No. 3, "□" specifies those of Comparative Example No. 1, and "○" specifies those of Comparative Example No. 2.

The evaluation results are illustrated in FIG. 3. In FIG. 3, the horizontal axis designates the load (kgf), and the vertical axis designates the friction coefficient. The product of Example No.1 (■) covered with the Si-containing amorphous hard carbon film, the product of Example No. 2 (▼) covered with the N-containing amorphous hard carbon film and the product of Example No. 3 (♦) covered with the Si and N-containing amorphous hard carbon film showed higher friction coefficient values under all of the load conditions than the product of Comparative Example No.1 (□) covered with the amorphous hard carbon and the heat-treated product of Comparative Example No.2 (○). Namely, concerning products covered with an amorphous hard carbon film, it is understood that the friction coefficient is enlarged in the presence of oils by adding Si or N in the carbon film or adding Si and N simultaneously.

(2) Frictional Characteristic Evaluation "B"

Coating Method

Example No. 4

On the surface of a plate specimen (dimension: 2 mm in thickness×30×30 mm) composed of S35C (carbon steel), an Si-containing amorphous hard carbon film was deposited under the identical conditions with Example No. 1. The surface roughness of the deposition surface was 1.0 μm Rz.

Comparative Example No. 3

For comparison, a plate specimen was labeled as an untreated product and was used as a specimen, plate specimen on which no amorphous hard carbon film was deposited and which was made of an S35C material having identical dimensions with Example No. 4.

Example No. 5

The sliding surface of an SUS440C (stainless steel) plate specimen (dimension: 2 mm in thickness×30×30 mm) was covered with an Si-containing amorphous hard carbon film by using a plasma CVD method. A methane gas was used as a carbon raw material, tetramethylsilane (TMS) was used as a silicon raw material, a mixture gas of hydrogen and argon was used as a carrier gas, and they were introduced into a plasma. The methane flow rate was 100 sccm, and the silicon flow rate was 1 sccm. Note the other coating conditions were such that the input electric power was 500 W, the coating temperature was 500° C., the pressure was 6 torr, and the coating rate was from 4 to 7 μm/hr. Under these conditions, the coating time was controlled to obtain an Si-containing amorphous hard carbon film whose film thickness was 2 μm. In the resulting amorphous hard carbon film, the Si content was 4 atomic %, and the surface roughness of the plate specimen was 2.4 μm Rz.

Example No. 6

Except that the methane flow rate was set to 50 sccm and the silicon flow rate was set to 4 sccm, the sliding surface of the plate specimen was covered with an Si-containing amorphous hard carbon film under the same coating conditions as Example No. 5. In the resulting amorphous hard carbon film, the Si content was 12 atomic %, and the surface roughness of the plate specimen was 2.5 μm Rz.

Example No. 7

Except that the methane flow rate was set to 50 sccm and the silicon flow rate was set to 10 sccm, the sliding surface of the plate test sample was covered with an Si-containing amorphous hard carbon film under the same coating conditions as Example No. 5. In the resulting amorphous hard carbon film, the Si content was 16 atomic %, and the surface roughness of the plate specimen was 3.3 μm Rz.

Comparative Example No. 4

An SUS440C (stainless steel) plate specimen (dimensions are the same as Example Nos. 5 through 7), which was not subjected to any surface treatment, was used as a test sample. Note that the surface roughness of this plate specimen was 2.1 μm Rz.

Evaluation Method

Figure 4:
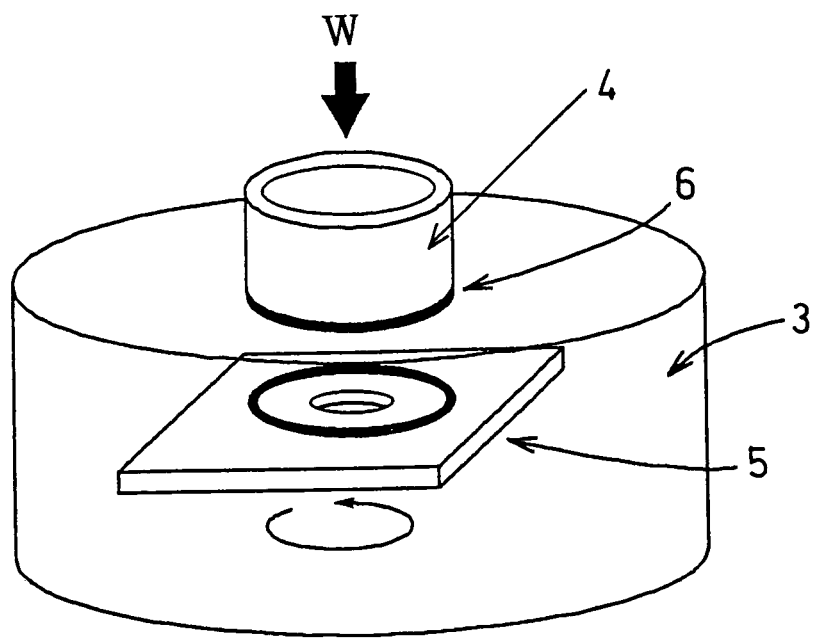
FIG. 4 is a schematic diagram for illustrating a friction test between a paper friction material and a metallic material. The friction test is carried out while attaching a paper friction material 6 on a ring test sample 4 and pressing it with a load W onto a plate test sample 5 rotating in an oil bath 3.

A wet friction test was performed between a paper friction material and a metallic material, wet friction test in which a metallic material was used for one of the sliding members and a paper friction material was used for the other. The outline of the testing method is illustrated in FIG. 4.

A paper friction material was used in which a machine-made paper composed of cellulose fibers was impregnated with a phenol resin as a binder and was hot cured. Note that the impregnated phenol resin content in the paper friction material was 60% by weight approximately when the paper friction material was taken as 100% by weight. The surface roughness of this paper friction material was from 10 to 15 μm Rz, moreover, the frictional area was 200 mm². This paper friction material was attached on the cross-section of a ring specimen whose outside diameter was 25.6 mm and thickness was 2.8 mm, and was fitted onto a stationary shaft of the testing machine. Moreover, a fastening holder with a plate specimen inserted was fitted onto a rotary shaft of the testing machine.

An evaluation test was carried out in a lubricating oil. The lubricating oil was such that "Castle Auto Fluid Type T-IV," a commercially available drivetrain system lubricating oil, was used in an amount of 200 mL. The testing conditions are recited in Table 3.

TABLE 3

| Step | Break-in | Test | | | | | | | | | |
|---|---|---|---|---|---|---|---|---|---|---|---|
| | 1 | 2 | 3 | 4 | 5 | 6 | 7 | 8 | 9 | 10 | 11 |
| Sliding Velocity (mm/s) | 1000 | 50 | 100 | 300 | 500 | 700 | 1000 | 1300 | 1500 | 1700 | 2000 |
| Load (kgf) | | | | | | 20 | | | | | |
| Contact Pressure (MPa) | | | | | | 1 | | | | | |
| Time (min.) | 30 | | | | | 1 for Each | | | | | |
| Oil Temp. (° C.) | | | | | | 80 | | | | | |

First, the plate specimen 5 is fastened at a predetermined position in the oil bath (oil bath 3) of the testing machine. Next, the paper friction material 6 fitted to the ring specimen 4 was brought into contact with the plate specimen 5, a load W of 20 kgf was applied to the ring specimen 4, and the plate specimen 5 was rotated at a sliding velocity of 1,000 mm/s for 30 minutes to break-in the paper friction material 6 with the amorphous hard carbon film surface of the plate specimen 5. Thereafter, the sliding velocity was changed in 10 stages while keeping the 20 kgf load constant, and the friction coefficient was measured under the respective sliding velocity conditions.

The sliding velocity was set at 50 mm/s, 100 mm/s, 300 mm/s, 500 mm/s, 700 mm/s, 1,000 mm/s, 1,300 mm/s, 1,500 mm/s, 1,700 mm/s and 2,000 mm/s, and was changed stepwise for every 1 minute. In the meantime, the oil temperature of the oil bath 3 was kept constant at 80° C.

Evaluation Results-1

Figure 5:
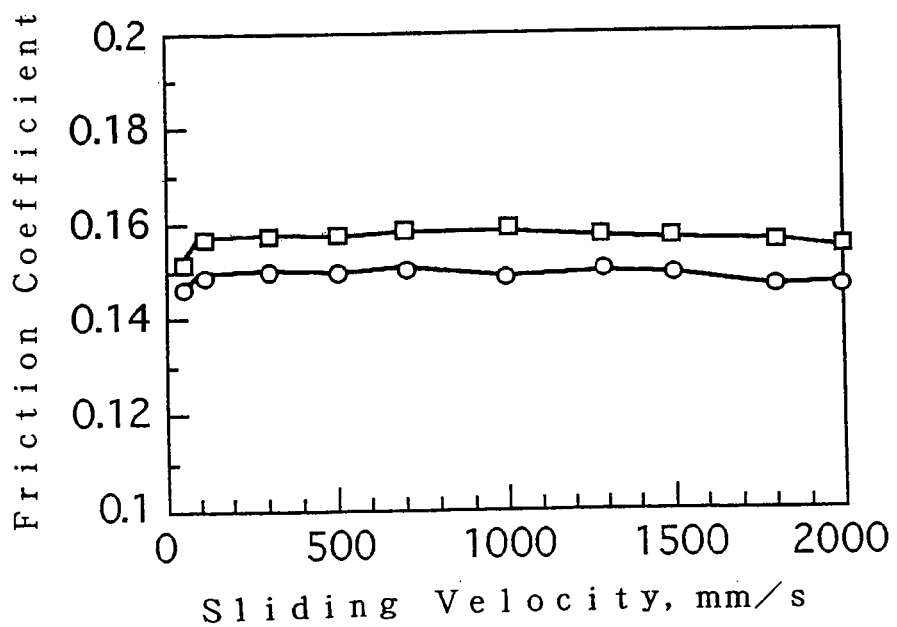
FIG. 5 is a graph for comparing the changes of friction coefficient by sliding velocity in the friction test between a paper friction material and a metallic material, friction test in which a substrate was S35C (carbon steel). "□" specifies the results of Example No. 4, and "○" specifies those of Comparative Example No. 3, an untreated product.

The measurement results of Example No. 4 and Comparative Example No. 3 in which the substrate was S35C (carbon steel) are illustrated in FIG. 5.

As can be seen from FIG. 5, the product of Example No. 4 (□) covered with the Si-containing amorphous hard carbon film showed higher friction coefficient values under all of the sliding velocity conditions than the untreated product of Comparative Example No. 3 (○).

Moreover, in the product of Example No. 4 (□) covered with the Si-containing amorphous hard carbon film, the friction coefficient (μ) increased when the sliding velocity was from 50 mm/s to 100 mm/s; it was constant in a range of from 100 mm/s to 1,000 mm/s; and it was lowered gradually beyond 1,000 mm/s. This tendency is substantially the same tendency as the untreated product of Comparative Example No. 3 (○), and is virtually parallel thereto in FIG. 5. That is, it has been possible to support that the product of Example No.4 covered with the Si-containing amorphous hard carbon film maintains a favorable μ–v characteristic, though it exhibits a high friction coefficient.

Evaluation Results-2

Figure 6:
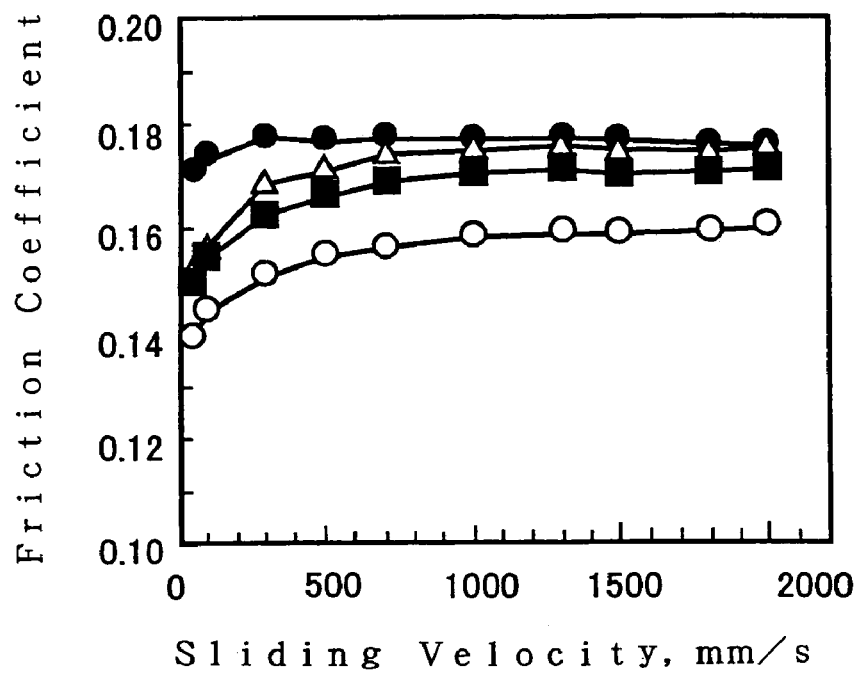
FIG. 6 is a graph for comparing the changes of friction coefficient by sliding velocity in the friction test between a paper friction material and a metallic material, friction test in which a substrate was stainless steel. "●" specifies the results of Example No. 5, "△" specifies those of Example No. 6, and "■" specifies those of Example No. 7. "○" specifies the results of Comparative Example No. 4.

The measurement results of Example Nos. 5 through 7, in which the substrate was SUS440C (stainless steel), and Comparative Example No. 4 are illustrated in FIG. 6. In FIG. 6, ● designates the variation of the friction coefficient by the sliding velocity in Example No. 5. Moreover, Δ is the measurement results of Example No. 6, and ■ is those of Example No. 7. ○ is the measurement results of Comparative Example No. 4.

All of Example Nos. 5 through 7 showed higher friction coefficient values than Comparative Example No. 4, the untreated product, under all of the sliding velocity conditions. Moreover, the lower the Si content in the Si-containing amorphous hard carbon film, the higher the friction coefficient tends to be herein. In addition, in Example Nos. 5 through 7, it is understood that the friction coefficient increased accompanied by the increase of the sliding velocity; when the sliding velocity was 1,000 mm/s or more, the friction coefficient was virtually constant in all of the examples to maintain a favorable μ–v characteristic.

(3) Frictional Characteristic Evaluation "C"

Deposition Method

Example Nos. 8 through 12

A plasma CVD method was used, a methane gas was used as a carbon raw material, tetramethylsilane (TMS) was used as a silicon raw material, a mixture gas of hydrogen and argon was used as a carrier gas, and they were introduced into a plasma. Here, the methane flow rate and the silicon flow rate were changed as set forth in Table 4, thereby preparing amorphous hard carbon films of Example Nos. 8 through 12 at 5 levels, amorphous hard carbon films whose silicon content differed. The coating conditions were such that the input electric power was 500 W, the coating temperature was 500° C., the pressure was 6 torr and the coating rate was from 4 to 7 μm/hr. Under these conditions, the coating time was controlled, thereby obtaining Si-containing amorphous hard carbon films whose film thickness was 2 μm. The analysis results on the composition of the resulting amorphous hard carbon films are recited in Table 4 as well.

Note that the substrate was such that an SUS440C (HV 650–750) block test piece was used, block test piece which was 6.3×15.7×10.1 mm and which was subjected to quenching and tempering, and each of said amorphous hard carbon films was formed on the 6.3×5.7 mm surface to use it as a test sample.

TABLE 4

| | Coating Condition | | | Composition of Amorphous Hard Carbon Film (atomic %) | | |
|---|---|---|---|---|---|---|
| Sample # | Coating Output (W) | TMS Flow Rate (sccm) | CH₄ Flow Rate (sccm) | Si | C | H |
| Comp. Ex. #5 | 200 | 0 | 50 | 0 | 75 | 25 |
| Ex. #8 | 500 | 1 | 100 | 4.1 | 65.9 | 30 |
| Ex. #9 | 500 | 2 | 50 | 9.8 | 60.2 | 30 |
| Ex. #10 | 500 | 4 | 50 | 11.6 | 56.4 | 32 |
| Ex. #11 | 500 | 10 | 50 | 15.6 | 55.4 | 29 |
| Ex. #12 | 500 | 10 | 0 | 22.0 | 46.0 | 32 |

Note)
The coating method was plasma CVD in all of these.

Comparative Example No. 5

Under the same conditions as Comparative Example No. 1, an amorphous hard carbon film was produced. The coating conditions and the analysis result on the composition of the amorphous hard carbon film are recited in Table 4 as well.

Note that the substrate was such that the same block test piece as Example Nos. 8 through 12 was used.

Evaluation Method

An evaluation method was such that the friction characteristic between a metallic material and another metallic material was evaluated under a wet condition in which metals were used for the two sliding members.

Figure 7:
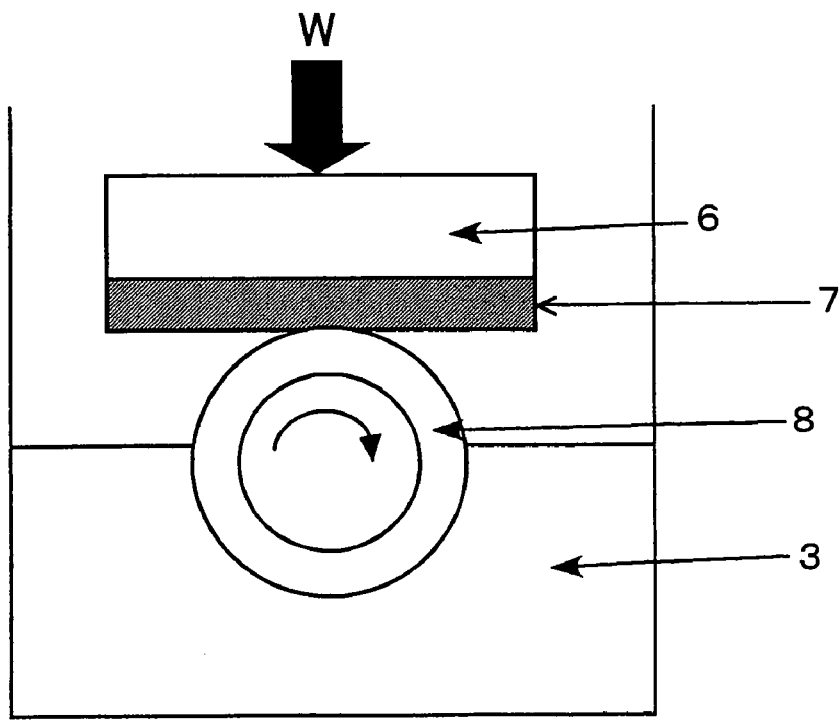
FIG. 7 is a schematic diagram for illustrating a ring-on-block test. The friction test is carried out while contacting an amorphous hard carbon film 7, formed on a block test sample 6, with a ring test sample 8, rotating in an oil bath 3, and applying a load W.

The friction coefficient and wear amount of the respective amorphous hard carbon films were measured by a ring-on-block type friction test ("LFW-1" type test produced by FALEX Co., Ltd.) to assess them. The outline of the testing method is illustrated in FIG. 7. The friction coefficient between a block specimen 6, covered with an amorphous hard carbon film 7, and a mating ring specimen 8, rotating in an oil bath 3, and the worn depth were measured. For the mating ring specimen 8, a FALEX S-10 ring specimen (material quality: SAE 4620 steel and hardness: HV 650–770), the standard specimen of the "LFW-1" type test, was used. Moreover, in an oil bath 3, "Castle Auto Fluid TC" was used in an amount of 100 mL as a drivetrain system lubricating oil, and the oil temperature was 80° C.

First, the block specimen 6 was brought into contact with the ring specimen 8, the revolution speed of the ring specimen 8 was set at 0.25 m/s in a no-load state, subsequently a load W was applied to the block specimen 6 so that it become 0.23 GPa, and the ring specimen 8 was rotated frictionally. After holding this state for 30 minutes, the friction coefficient and the wear depth were measured.

Evaluation Results

Figure 8:
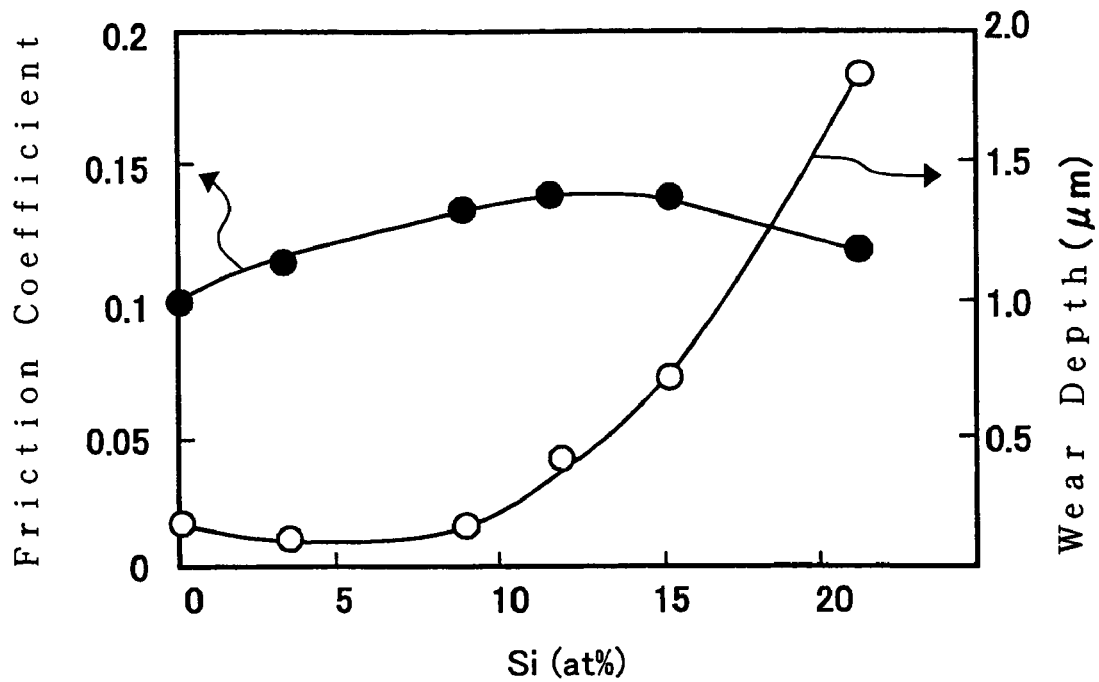
FIG. 8 is a graph for illustrating the changes of friction coefficient by the Si content of amorphous hard carbon films and the changes of wear depth, changes which were obtained by the ring-on-block test. "●" specifies the left scale, the changes of friction coefficient, and "○" specifies the right scale, the changes of wear depth.

The results are illustrated in FIG. 8. In FIG. 8, the horizontal axis specifies the Si content in the amorphous hard carbon films by atomic %, and the vertical axis is such that the left vertical axis is the friction coefficient and the right vertical axis is the wear depth (μm). The changes of the friction coefficient by the Si content is designated with "●" and the variation of the worn depth is designated with "○."

The friction coefficient increased as the Si content increased as compared with Comparative Example No. 5 (Si content: 0), and increased up to Example No. 11, Si=15.6 atomic %. However, in Example No. 12, Si=22.0 atomic %, it decreased to such an extent equal to Example No. 8 (4.1 atomic % Si). On the other hand, the worn depth hardly changed up to Si=11.6 atomic %, however, the worn depth increased sharply when exceeding this, Example No. 12, Si=22.0 atomic %, was worn to about 1.8 μm to such a state immediately before the amorphous hard carbon film (film thickness: 2 μm) disappeared, and accordingly it is understood that there arose a problem in terms of the wear resistance. Hence, when the mating member is metallic materials, as for the film composition provided with both high friction coefficient and wear resistance, it was possible to confirm that the range up to Example Nos. 8 through 11 is desirable, and that 3 atomic %<Si<20 atomic % is an optimum film composition.

(4) Frictional Characteristic Evaluation "D"

Coating Method

Example No. 13

Under the same coating conditions as Example No. 8, the surface of a FALEX S-10 ring specimen whose surface was grounded to 0.4 μm Rz was covered with an amorphous hard carbon film. The Si content of the obtained amorphous hard carbon film was 4.1 atomic %, and the film thickness was 2 μm.

Example No. 14

Under the same coating conditions as Example No. 10, the surface of a FALEX S-10 ring specimen whose surface was grounded to 0.4 μm Rz was covered with an amorphous hard carbon film. The Si content of the obtained amorphous hard carbon film was 11.6 atomic %, and the film thickness was 2 μm.

Example No. 15

Under the same coating conditions as Example No. 11, the surface of a FALEX S-10 ring specimen whose surface was grounded to 0.4 μm Rz was covered with an amorphous hard carbon film. The Si content of the obtained amorphous hard carbon film was 15.6 atomic %, and the film thickness was 2 μm.

Comparative Example No. 6

A film was formed by using a magnetron sputtering method as for a coating method, and a carbon target as for a carbon raw material, moreover, by using a tungsten target as for a tungsten raw material. A substrate was such that a FALEX S-10 ring specimen whose surface was grounded to 0.4 μm Rz was used in the same manner as Example Nos. 13 through 15. The composition of the amorphous hard carbon film was 10W-60C-30H by atomic %. Moreover, the film thickness was 2 μm similarly to the examples.

Comparative Example No. 7

A FALEX S-10 ring specimen which was not subjected to any coating process but which was grounded to 0.4 μm Rz was used as a test sample.

Evaluation Method

An evaluation method was such that the friction characteristic between a metallic material and a ceramic material was evaluated under a wet condition in which a metallic member was used for one of the sliding members and a ceramic member was used for the other.

Figure 9:
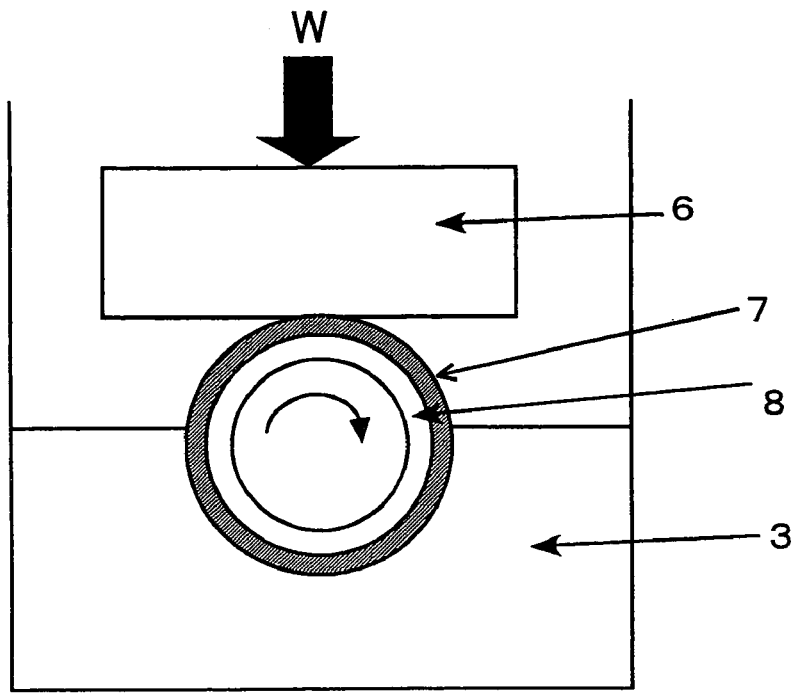
FIG. 9 is a schematic diagram for illustrating a ring-on-block test, however, 6 designates a ceramic block test sample, and the friction test is carried out while forming an amorphous hard carbon film 7 whose Si content is varied on the surface of a ring test sample 8.

The friction coefficient of the respective amorphous hard carbon films was measured by the same ring-on-block type friction test ("LFW-1" type test produced by FALEX Co., Ltd.) as said friction characteristic evaluation "C" to measure it. The outline of the testing method is illustrated in FIG. 9. Here, contrary to FIG. 7, the surface of a ring specimen 8 was covered with an amorphous hard carbon film 7. And, it was contacted with a block specimen 6 composed of a ceramic material in an oil bath 3, and was rotated to measure the friction coefficient.

Here, the ceramic block 6, a mating member sliding on the ring specimen covered with the amorphous hard carbon film 7, was $Al_2O_3$ and $Si_3N_4$ both of which exhibited a surface roughness of from 2 to 3 μm Rz. Note that the dimension of the ceramic block 6 was 6.3×15.7×10.1 mm, and the 6.3×15.7 mm surface was contacted with the ring specimen 8 for measuring. Moreover, in an oil bath 3, "Castle Auto Fluid TC" was used in an amount of 100 mL as a drivetrain system lubricating oil, and the oil temperature was 80° C.

First, the block specimen 6 was brought into contact with the ring specimen 8, a load W of 300 N was applied, and was held at a sliding velocity for 10 minutes to determine a friction coefficient. The sliding velocity was set at three levels, 0.1 m/s, 0.3 m/s and 0.5 m/s.

Evaluation Results

Figure 10:
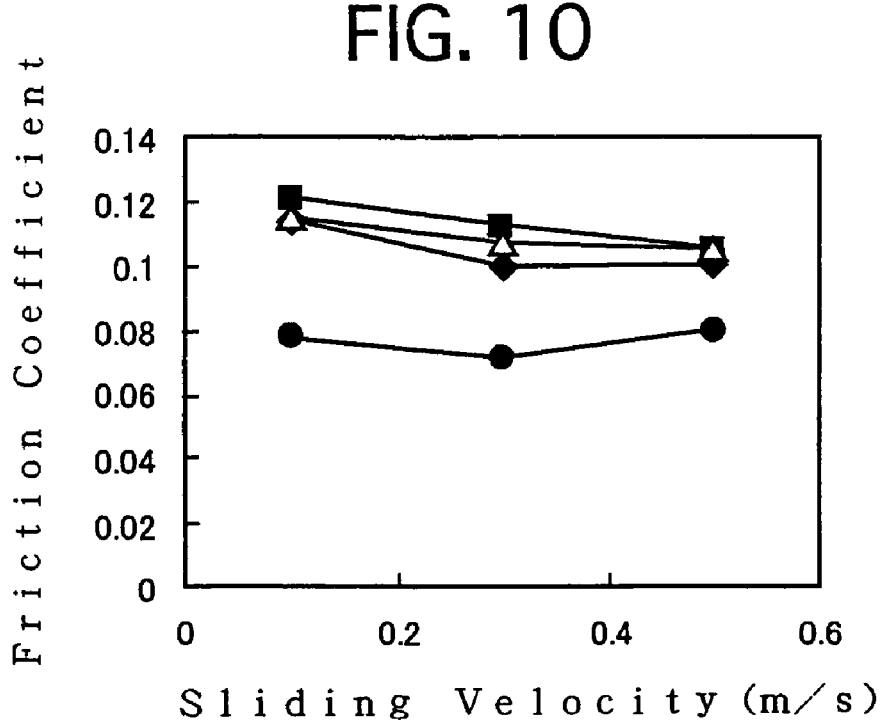
FIG. 10 illustrates the changes of friction coefficients by sliding velocity in the friction test, changes which were exhibited by amorphous hard carbon films which slid on an $Al_2O_3$ ceramic and whose Si content differed. Here, the marks are such that "♦" is Example No. 13, "□" is Example No. 14, "△" is Example No. 15, and "●" is Comparative Example No. 6, respectively. Moreover.
Figure 11:
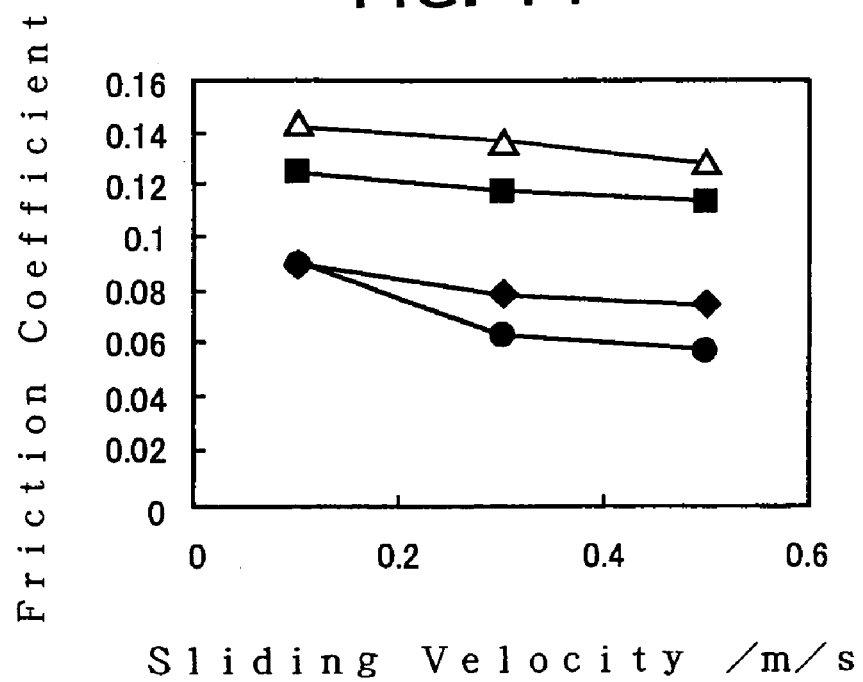
FIG. 11 illustrates the variation of friction coefficients by sliding velocity in the friction test, changes which were exhibited by amorphous hard carbon films which slid on an $Si_3N_4$ ceramic and whose Si content differed. Here, the marks are such that "♦" is Example No. 13, "□" is Example No. 14, "△" is Example No. 15, and "●" is Comparative Example No. 7, an untreated ring, respectively.

The results are illustrated in FIG. 10 and FIG. 11. FIG. 10 illustrates the changes of the friction coefficient with respect to the sliding velocity, friction coefficient which was exhibited by the amorphous hard carbon films slid on the $Al_2O_3$ ceramic block and whose Si content differed. Here, the marks are such that "◆" is Example No. 13 (4.1% Si), "□" is Example No. 14 (11.6% Si), "Δ" is Example No. 15 (15.6% Si), and "●" is Comparative Example No. 6 (10% W), respectively. The friction coefficient of the Si-containing amorphous hard carbon films exhibited higher values at all of the sliding velocities than the friction coefficient of the W-containing amorphous hard carbon film.

Moreover, FIG. 11 illustrates the changes of the friction coefficient with respect to the sliding velocity, friction coefficient which was exhibited by the amorphous hard carbon films slid on the $Si_3N_4$ ceramic block and whose Si content differed. Here, the marks are such that "◆" is Example No. 13 (4.1% Si), "□" is Example No. 14 (11.6% Si), "Δ" is Example No. 15 (15.6% Si), and "●" is Comparative Example No.7, the untreated ring, respectively. Herein as well, similarly to FIG. 10, the friction coefficient of the Si-containing amorphous hard carbon films exhibited higher values at all of the sliding velocities than the friction coefficient of the untreated ring.

Namely, it is understood that the amorphous hard carbon film containing Si in an amount of from 3 to 20 atomic % is such that the friction coefficient increases under wet conditions even when the mating member is ceramic members in the same manner as it is metallic members.

(5) Sliding Characteristic Evaluation

Sample Preparation

The surface of a disk specimen, which was composed of an SKH 55 material and whose thickness was 3 mm and diameter was 30 mm, was covered with Si-containing amorphous hard carbon films, whose Si addition was changed in 6 stages from 0 to 30 atomic % (by atomic % excluding the H content), to use it as test samples. That is, the Si addition was set at 6 stages, 0, 8, 17, 22, 26 and 32 atomic %. The coating method of the amorphous hard carbon films was the same as Example No. 1. The surface roughness of the disk specimens was 0.2 µm Rz or less, and moreover the thickness of each of the formed Si-containing amorphous carbon films was 3 µm.

Evaluation Method

The frictional characteristic of the Si-containing amorphous carbon films were evaluated by a ball-on-disk test in a drivetrain system lubricating oil. The mating member was an SUJ2 ball whose diameter was 6.35 mm. The disk specimens on which the Si-containing amorphous hard carbon film with the respective additions were set in a predetermined jig, and the friction coefficient was measured under the conditions that the load was 50 N and the sliding velocity was 0.2 m/s.

Evaluation Results

Figure 12:
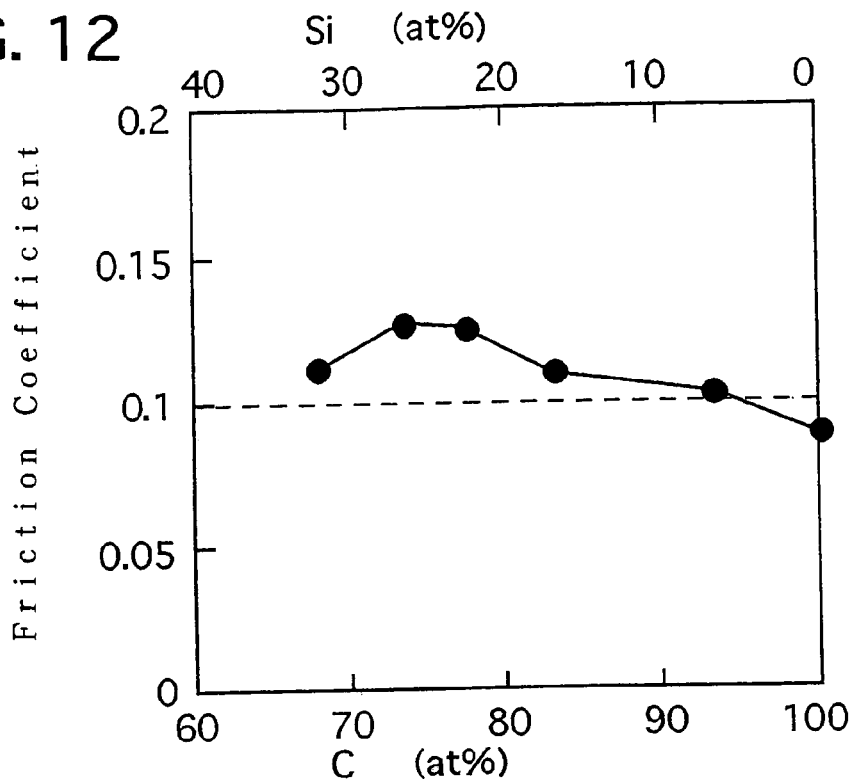
FIG. 12 is a graph for illustrating the change of friction coefficient by the Si content of amorphous hard carbon films, change which was obtained by a ball-on-disk test.

FIG. 12 illustrates the results of the ball-on-disk test, i.e., the changes of the friction coefficient by the Si addition into the amorphous hard carbon films. Here, the Si (atomic %) and C (atomic %) are values which are calculated by excluding the H contents, and are accordingly Si (atomic %)+C (atomic %)=100 (atomic %). The friction coefficient of the SKH 55 untreated product, the comparative example, was 0.1 depicted with the dashed line in the drawing.

From FIG. 12, it was understood that the friction coefficient of the amorphous hard carbon film free from the Si addition was lower than the untreated SKH55; whereas, in the Si-containing amorphous hard carbon films, the friction coefficient tended to be higher accompanied by the increment of the Si addition (the decrement of the C content). In particular, when the Si addition exceeded 10 atomic %, it was possible to confirm that the friction coefficient of the Si-containing amorphous hard carbon films become higher than the friction coefficient of the untreated SKH55.

(6) Hardness Evaluation

The micro Vickers hardness HV of the respective specimens were measured by using each of Si-containing amorphous hard carbon films which were prepared in the same manner as the test samples used in aforementioned (5) Frictional Characteristic Assessment, thereby examining the relationship between the Si addition and the hardness of the amorphous hard carbon films. The covered thickness of the respective test samples was 3 µm.

Figure 13:
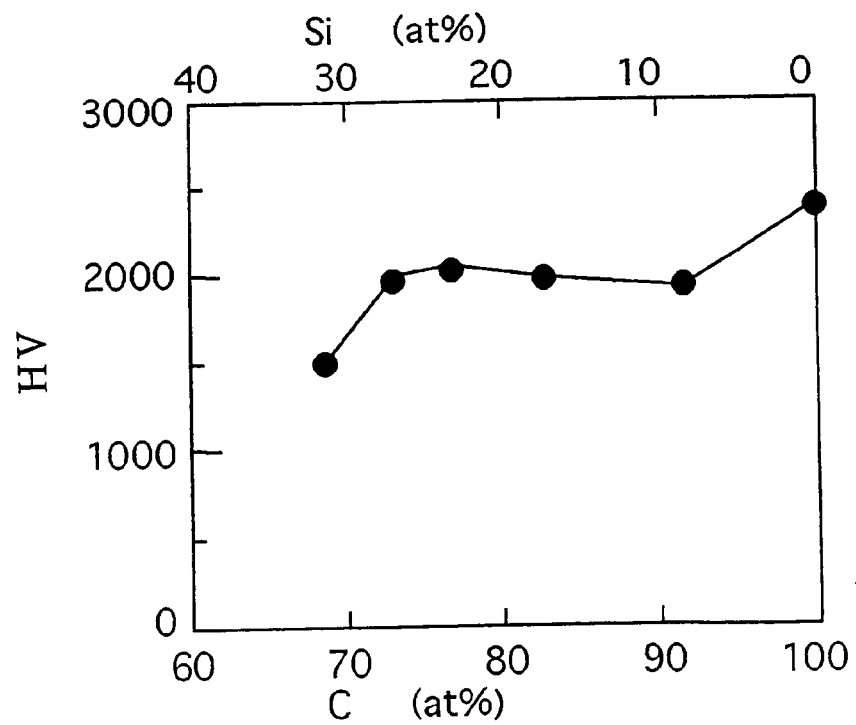
FIG. 13 is a graph for illustrating the change of Vickers hardness by the Si content of amorphous hard carbon films.

The results are illustrated in FIG. 13. Although the hardness was lowered more or less by adding Si as compared with no Si addition, a remarkably higher value, HV 1,500 or more, was obtained compared with HV 800 of the SKH55 untreated product even when Si was comprised 30 atomic % or more. Therefore, materials covered with the present Si-containing amorphous carbon film was found to be materials which are good in terms of the wear resistance regardless of the Si addition amounts.

INDUSTRIAL APPLICABILITY

An object of the present invention is to provide a high frictional sliding member which exhibits a high friction coefficient and a favorable µ–v characteristic stably under wet sliding conditions using oils, and which is excellent in terms of the wear resistance, but whose mating-member aggressiveness is low.

The present high frictional sliding member is such that, when it is used, for example, in wet clutches which are used in automatic transmissions, torque transfer systems, limited slip differentials and the like, and the sliding portions for power transmission units, such as synchronizers of manual transmissions and so forth and transmission units and so on of continuously variable transmissions, it can improve not only the torque capacity of the units but also the durability.

The invention claimed is:

1. A high frictional sliding member comprising:
a substrate; and
an amorphous hard carbon film formed integrally on a surface of the substrate, having a surface, for sliding under wet conditions, including at least either one of Si and N in an amount of from 1 to 50 atomic %, and having a sliding coefficient of friction in oil greater than 0.10, wherein a surface roughness of said sliding surface is from 0.3 to 10 µm Rz.

2. The high frictional sliding member set forth the claim 1, wherein said amorphous hard carbon film contains H in an amount of from 1 to 50 atomic %.

3. The high frictional member set forth in claim 1, wherein said amorphous hard carbon film contains Si in an amount of from 3 to 20 atomic %.

4. The high frictional sliding member set forth in claim 1, wherein a hardness of said amorphous hard carbon film is HV 800 or more.

5. The high frictional sliding member set forth in claim 1, wherein an adhesion strength between said substrate and said amorphous hard carbon film is 30 N or more.

6. The high frictional sliding member set forth in claim 1, wherein a thickness of said amorphous hard carbon film is 1 µm or more.

7. The high frictional sliding member set forth in claim 1, wherein said substrate is either one of metal, ceramics and resin.

8. The high frictional sliding member set forth in claim 1, wherein said amorphous hard carbon film is treated with a drivetrain system lubricating oil as said oil treatment including at least one member selected from the group consisting of alkaline earth metal detergent and ashless dispersant.

9. The high frictional sliding member set forth in claim 1, wherein said amorphous hard carbon film includes on a surface thereof at least one member selected from the group consisting of $Ca+$, $C_5H_9+$ and $C_7H_{13}+$.

10. A high frictional sliding member system comprising:

a substrate;

an amorphous hard carbon film formed integrally on a surface of the substrate, having a surface for sliding under wet conditions, including at least either one of Si and N in an amount of from 1 to 50 atomic %, and having a sliding coefficient of friction in oil greater than 0.10; and a mating member to be slid on said amorphous hard carbon film, wherein a surface roughness of said sliding surface is from 0.3 to 10 μm Rz.

11. The system of claim 10, wherein the mating member comprises either one of metal, ceramics and resin.

* * * * *